United States Patent [19]

Owsen

[11] 4,136,455
[45] Jan. 30, 1979

[54] FLOATING HEAD CHECKING FIXTURE

[75] Inventor: Paul J. Owsen, Traverse City, Mich.

[73] Assignee: Century Specialties, Inc., Traverse City, Mich.

[21] Appl. No.: 771,180

[22] Filed: Feb. 23, 1977

[51] Int. Cl.² .................... G01B 7/02; G01B 7/12
[52] U.S. Cl. .................... 33/147 F; 33/147 E; 33/147 N; 33/178 E
[58] Field of Search ............ 33/143 R, 143 L, 147 R, 33/147 E, 147 F, 147 N, 147 L, 178 E

[56] References Cited

U.S. PATENT DOCUMENTS

| 3,103,072 | 9/1963 | Golley et al. | 33/143 L |
| 3,414,978 | 12/1968 | Prow | 33/143 R |
| 3,781,997 | 1/1974 | Pagella et al. | 33/147 E |
| 3,851,396 | 12/1974 | Klabunde | 33/147 N |

FOREIGN PATENT DOCUMENTS 1482052  4/1967  France .................... 33/143 R

Primary Examiner—Richard R. Stearns
Attorney, Agent, or Firm—Krass & Young

[57] ABSTRACT

The checking fixture includes a pair of opposed gaging fingers drivingly interengaged so as to be moved together to engage a workpiece, with a simplified arrangement for manipulating the position of both the gaging fingers with a single control knob, insuring a uniformly applied gaging pressure for urging the gaging fingers into contact with the workpiece while compensating for eccentric location of the workpiece in the gage. Rotation of a control knob assembly in one direction causes opening of the upper and lower gaging fingers, the assembly allowing a "stay-open" positioning of the gaging fingers in any adjusted open position. The control knob assembly is reversely rotated to close the fingers, with controlled release of the rotary connection between the central knob and ratchet gear and the pinion gear or spool upon contact of the upper finger with the workpiece at which point a gaging pressure exerted upwardly on the lower finger urging the same into engagement with the workpiece solely by a counterweight upward force.

36 Claims, 8 Drawing Figures

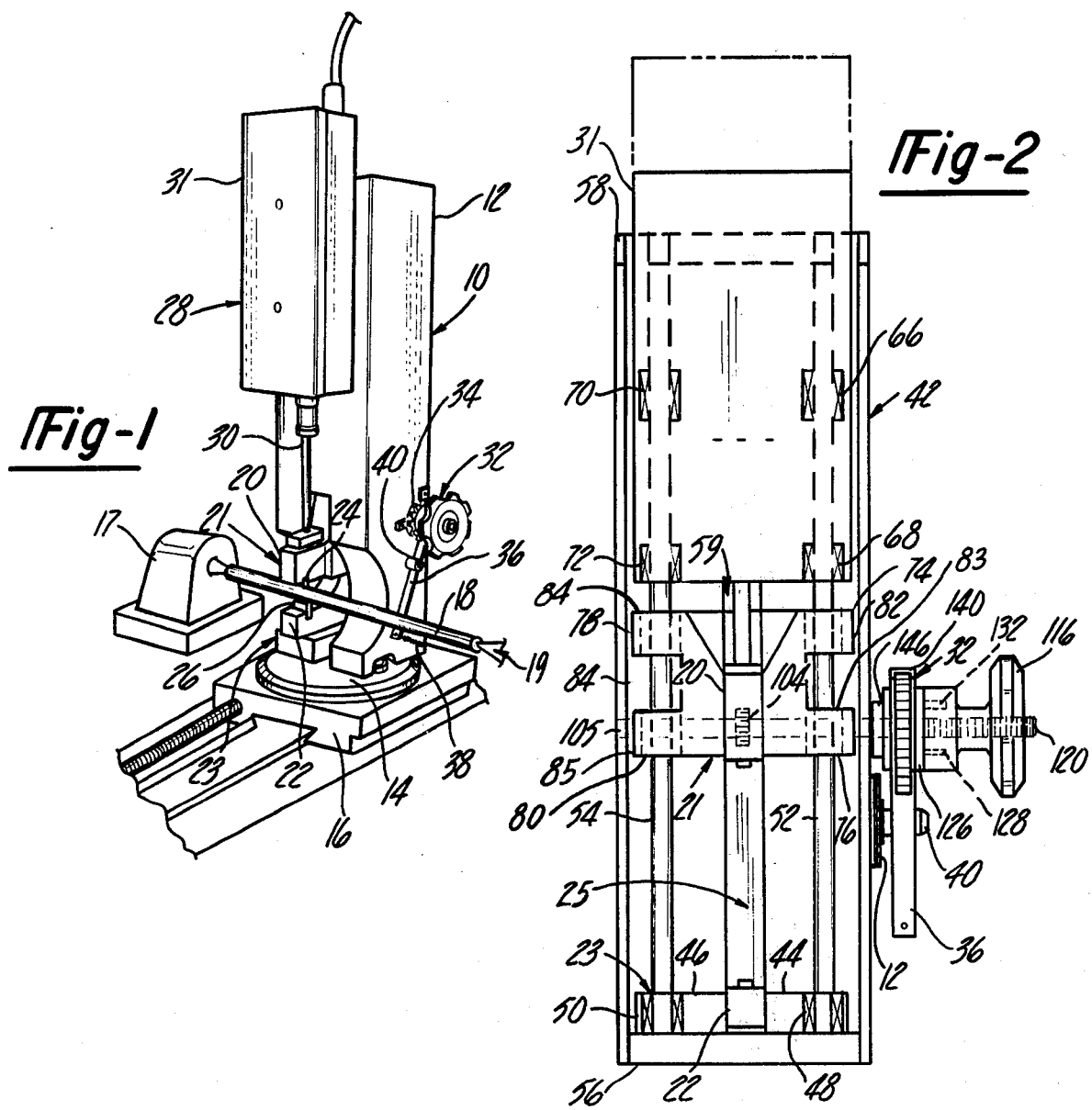
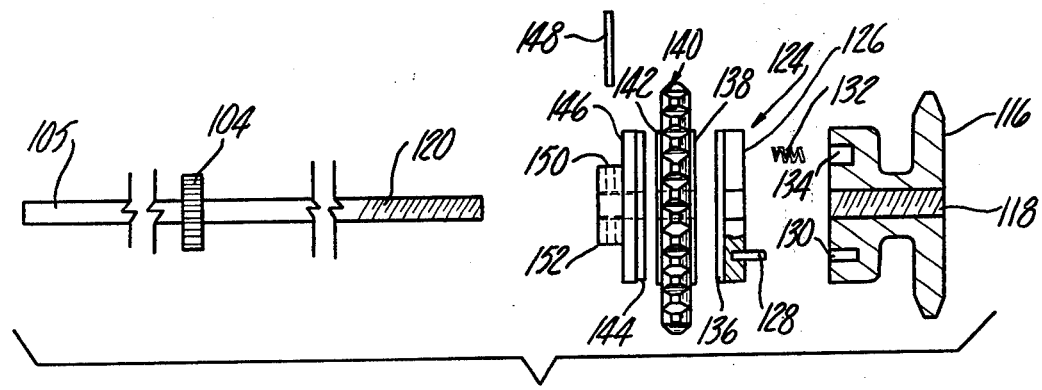

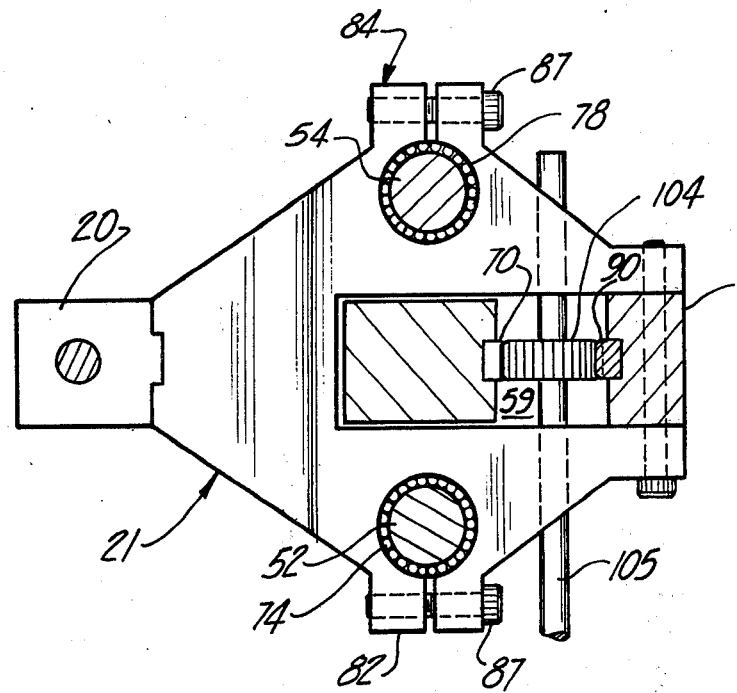
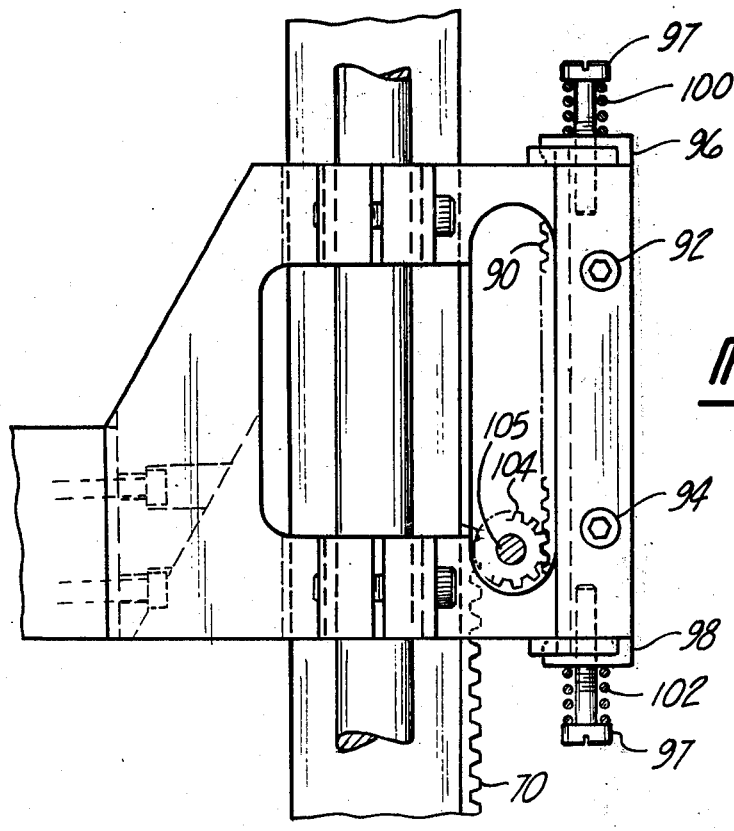

FLOATING HEAD CHECKING FIXTURE

BACKGROUND OF THE INVENTION

1. Field of the Invention

This invention concerns measuring gages and more particularly measuring gages of the type in which opposed gaging fingers carrying gaging contacts are adapted to engage a workpiece to measure the dimension of the workpiece part disposed in contact with the gage contacts.

2. Description of the Prior Art

Opposed contact gaging devices are widely used for measurement of outside and inside dimensions of workpieces such as round shafts, tubing, etc. These devices include a pair of opposed gaging fingers which are adapted to be moved into and out of engagement with the workpiece, with a displacement transducing arrangement generally provided measuring the relative position of the opposed gaging fingers to thereby generate signals corresponding to the dimension of the workpiece disposed between the gaging contacts. Control of the gaging contacts, both into and out of engagement with the workpiece, is a critical aspect in the design of such gages, but particularly critical is the mode in which the opposed gaging fingers engage with the workpiece, since the accuracy of such gages is largely dependent on the uniformity of gaging pressure applied during measuring operations. Variations in deflection of the parts and the gage structure during the gaging operations would contribute greatly to the variations in readings obtained by such devices.

Another problem is encountered in the measurement of workpieces which are not properly centered within the gage, i.e., errors may arise if the parts are out-of-round or are bowed along their length, etc., since the opposed contacts usually move into engagement with the workpiece simultaneously, and if the workpiece is not centered one or the other contact would encounter one or the other surface of such workpiece first, arresting further movement inward and contributing to a false reading.

The convenience in use of such devices would also be greatly enhanced if a simplified control over both of the gaging fingers could be had with a single manipulation and which also provided for controlled movement inward, thus to avoid excessively sharp impacts with the workpiece in the case of spring bias or counterweighted movements.

Any such devices should, of course, if possible, be as simple as possible to minimize manufacturing costs and maintenance requirements, and to improve reliability.

Typical devices of the sort described are disclosed in U.S. Pat. Nos. 3,851,396, 3,781,997, and 3,802,087. All of these devices disclose measuring gages of this type which either require complex manipulations by the operator, and all involve excessively elaborate constructions which for the most part require the operator to separately manipulate each of the opposed gaging fingers, at least during set up operations.

It is, therefore, an object of the present invention to provide an opposed contact measuring gage which provides for carefully controlled and uniform application of a gaging pressure to a workpiece.

It is a further object of the present invention to provide an arrangement to compensate for a misaligned or otherwise off-center positioned workpiece.

It is yet another object of the present invention to provide an opposed contact measuring gage in which the opposed gaging fingers are manipulated by a single control device which is of very simple construction and which allows controlled movement of the gaging fingers both into and out of engagement of the workpiece and which furthermore allows positioning of the gaging contacts in any adjusted open position.

It is still another object of the present invention to provide a mechanism which allows automatic clutching and release of a rotary shaft with rotation of a control knob.

SUMMARY OF THE INVENTION

These and other objects of the present invention which will become apparent upon a reading of the following claims are provided by a simplified arrangement for manipulating the position of both the gaging fingers with a single control knob during set up and gaging operations while insuring a uniformly applied gaging pressure for urging the gaging fingers into contact with the workpiece and which also compensates for eccentric location of the workpiece in the gage such as may occur due to an out-of-round or bent condition of the workpiece. The gaging fingers are drivingly interconnected in a first embodiment by a pair of gear racks, one secured to the lower gaging finger, and a second floatingly connected to the upper gaging finger by centering a spring mounting thereof, and also by a pinion gear engaging both gear racks. In a second embodiment, a rotary spool wound with cables secured to each gaging finger provides the driving interconnection. A control knob assembly is also provided to rotate the pinion gear or spool in a direction causing opening of the upper and lower gaging fingers, the control knob including a clutch mechanism creating a driving rotary connection between the control knob and a shaft to which the pinion gear is secured upon rotation of the control in a direction tending to open the gaging fingers to any selected position with a ratchet gear also thereby clutched to the pinion gear or spool shaft allowing a "stay-open" positioning of the gaging fingers in any adjusted open position. The control knob assembly may also be reversely rotated to close the fingers, with means for controllably releasing the rotary connection between the central knob and ratchet gear and the pinion gear or spool upon contact of the upper finger with the workpiece at which point the pinion gear becomes entirely free to allow a gaging pressure to be exerted upwardly on the lower finger urging the same into engagement with the workpiece solely by the counterweight upward force.

DESCRIPTION OF THE DRAWINGS

FIG. 1 is a perspective view of a measuring gage according to the present invention.

FIG. 2 is a front elevational view of the measuring gage depicted in FIG. 1 with the outer housings removed.

FIG. 4 is an exploded view of the control knob assembly and pinion gear shaft included in the measuring gage depicted in FIGS. 1 through 3.

FIG. 5 is a view of the section 5 — 5 taken in FIG. 3.

FIG. 6 is an enlarged perspective view of a portion of the gear rack mounting arrangement for the upper finger shown in FIG. 3.

DETAILED DESCRIPTION

Figure 3:
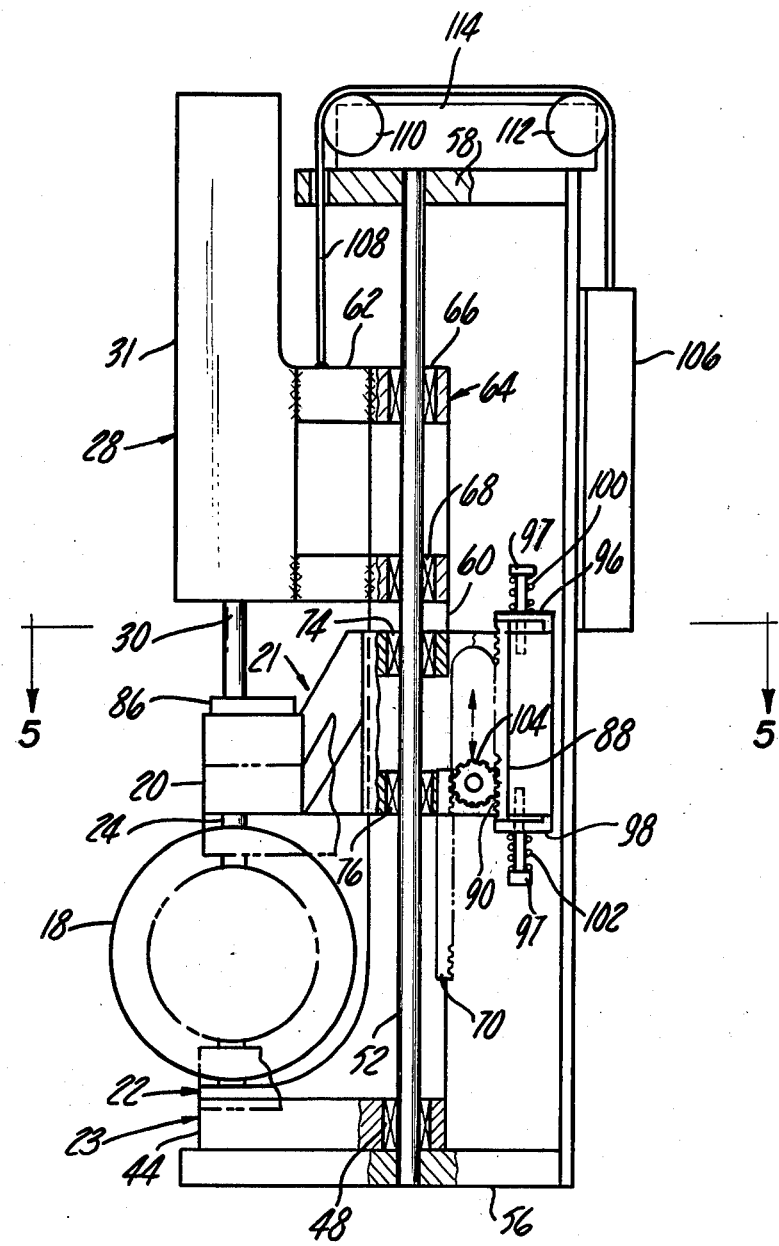
FIG. 3 is a side elevational view of the measuring gage depicted in FIG. 2.

In the following detailed description certain specific terminology will be utilized for the sake of clarity, and a particular embodiment described in accordance with the requirements of 35 USC 112, but it should be understood that the same is not intended to be limiting as indeed the invention is capable of many variations within the scope of the appended claims.

Referring to the drawings, the measuring gage 10 according to the present invention includes a gage housing 12 supported on a base plate 14 which in turn may be bolted or otherwise secured to a way unit 16 to provide in and out positioning of the measuring gage 10 with respect to the workpiece 18 which is supported typically between centers 17 and 19, and adapted to be engaged by the measuring gage 10 so as to measure its outside diameter. A pair of gaging finger assemblies are provided, a first or upper gaging finger assembly 21, and a second or lower gaging finger assembly 23 in the measuring gage 10 which are located to define a gaging opening 25 therebetween. The upper and lower gaging finger assemblies 21 and 23 include gage finger members 20 and 22 respectively adapted to be moved towards and away from each other in order to engage the workpiece 18 with a pair of gaging contacts 24 and 26, connected to the upper gaging finger 20 and lower gaging finger 22 respectively. A displacement transducer 28 is included, which transducer includes a sizing rod 30 secured for movement with the upper gaging finger 20.

The displacement transducer 28 also includes a housing 31 adapted to be connected to the lower gaging finger 22 as will be described below, such that the sizing rod 30 and housing 31 are relatively moved by relative movement of the upper gaging finger 20 and lower gaging finger 22. The displacement transducer 28 may be any of the various known types in which linear movement of the sizing rod 30 relative the housing 31 generates a corresponding signal such as the electrical signals generated by a linearly variable differential transformer transducer (LVDT) or any of various optical or electromagnetic displacement transducers of suitable accuracy to give reliable indications, as to one ten thousandths of an inch, for typical applications.

A control knob assembly 32 is included for manipulating the upper gaging finger 20 and lower gaging finger 22 and a ratchet gear 34 engaged by a ratchet pawl spring 36 spring loaded at 38 and pivotally mounted at 40 to the gage housing serves to maintain the relative position of the upper and lower gaging fingers 20 and 22 in any adjusted open position. The details of this assembly will hereinafter be described.

Accordingly, means are provided for generating gaging signals corresponding to the relative position of the upper gaging finger 20 and the lower gaging finger 22 to thereby allow gaging of a workpiece part disposed therebetween and in engagement with the gaging contacts 24 and 26.

The lower gaging finger 22 is slidably mounted in a gage frame 42 by a pair of lateral extensions 44 and 46 which carry slide bearings 48 and 40, respectively, supported on a pair of vertical guide shafts 52 and 54 secured between a frame base plate 56 and a frame top plate 58, so as to be vertically slidable thereon. The lower gaging finger 22 is also mounted by means of a vertical extension 60 extending vertically upward through a clearance space 59 in the upper gaging finger 20 and includes an upper portion 64 which carries slide bearings 66 and 68, 70 and 72 which are slidably received on the vertical guide shafts 52 and 54 as indicated so that means are provided for slidably mounting the lower gaging finger 22. Secured to the vertical extension bar 60 in the region of the clearance space is a gear rack 70 affixed thereto.

The vertical extension 60 is secured to both the lower gaging finger 22 and to a connector section 62 as by welding, which connector section 62 is in turn welded to the housing 31 as indicated in FIG. 3 to connect the housing 31 to the lower gaging finger 22.

The upper gaging finger 20 is also mounted for slidable vertical movement on the vertical guide shafts 52 and 54 by means of bearing sets 74 and 76, 78 and 80 carried by respective lateral protuberances 82, 83, 84 and 85 of the upper gaging finger 20. Each bearing set is retained by capscrews 87 cooperating with split sections of each of the protuberances, as shown in FIG 5. The upper gaging finger 20 is connected to the sizing rod 30, as described above by means of a coupling arrangement 86.

The upper gaging finger 20 has a rack mounting bar 88 to which is "floatingly" mounted so as to allow some relative movement therebetween, a gear rack 90 located in the region of the clearance space 59 and generally opposite gear rack 70. Rack mounting bar 88 is secured to the upper gaging finger 20 by cap screws 92 and 94 extending through the rack mounting bar 88. Centering side plates 96 and 98 are urged to engage the ends of the gear rack 90 by means of a pair of centering springs 100 and 102 retained by cap screws 97 so as to allow a certain amount of relative movement between the rack 90 and the upper gaging finger 20 upon engagement of the upper gaging finger 20 with the workpiece 18 as will be described herein. The upper spring 100 is slightly stronger to preload the gear racks 70 and 90 to eliminate lash.

The upper gaging finger 20 and the lower gaging finger 22 are drivingly interengaged with each other by means of a pinion gear 104 which is in mesh with both rack 70 and rack 90 so that together they provide the driving interengagement thereof. The pinion gear 104 is supported for rotation by being affixed to a rotary pinion gear shaft 105 supported in the gage frame 42. This driving interengagement produces a corresponding movement of the upper and lower gaging fingers 20 and 22 in opposite directions, i.e. they move either toward each other or apart from each other, except when the centering springs 100 and 102 are deflected by engagement of the upper gaging finger 20 with the workpiece before contact is made with the lower gaging finger 22.

The housing 31 and the attached lower gaging finger 22 are biased upwardly as viewed in FIGS. 1 through 3 on the guide shafts 52 and 54 by means of a counterweight 106 attached by means of a cable 108 looped over a pair of pulleys 110 and 112 onto an upper bracket 114, as shown in FIG. 3. This also biases the upper gaging finger 20 downwardly by virtue of the driving interengagement produced by the pinion gear 104, so that the counterweight 106 provides means for exerting a biasing force acting on the upper and lower gaging fingers 20 and 22 tending to close the gage opening 25. The weight of the counterweight 106 should be selected to overcome the friction present and thus be slightly in excess of the weight of the lower gaging finger 22 and transducer structure attached so as to apply some slight gaging pressure, i.e. a force on the order of 2 ounces.

The centers 17 and 19 should be positioned so that the workpiece 18 is located with respect to the gaging clearances so that the upper gaging finger contact 24 contacts the workpiece 18 first. Upon contact of the upper finger 20 with the workpiece 18, continued upward movement of the lower gaging finger 22 is allowed by virtue of the extension-compression of the centering springs 100 and 102 which provide a "float", to compensate for misalignment of the part or an out-of-round condition, etc. as described, even though the upper gaging finger 20 and the lower gaging finger 22 are drivingly interengaged.

The reason for such float can be understood by considering what would occur if both gear racks 70 and 90 were rigidly attached to their respective gaging fingers 20 and 22. If one or the other of said gaging contacts 24 or 26 engages the workpiece 18 before the other, further rotation of the pinion gear 104 will be arrested, in turn arresting further movement of the other gaging finger assembly because of its engagement with its respective gear rack, thus creating a false reading.

This arrangement thus allows a driving interengagement for allowing a single knob manipulation and a bias force applied by a single counterweight 106 without creating the possibility of such errors. The position of the upper gaging finger 20 and the lower gaging finger 22 in all conditions of the measuring gage 10 other than during an actual gaging operation is controlled by the control knob assembly 32.

The control knob assembly 32 includes a control knob 116 which is threaded on an end of the pinion gear shaft 105 with a lefthanded thread by virtue of an internal bore 118 which is threaded to correspond to a threaded section 120 formed on the end of pinion gear shaft 105. The control knob 116 is adapted to be controllably clutched to the pinion gear shaft 105 and thereby rotationally connected to the pinion gear 104 by means of a clutch assembly 124 which also at the same time controls clutching of a ratchet gear 140 to the pinion gear shaft 105. This includes a clutch disk 126 slidably mounted on the pinion gear shaft 105 which is caused to rotate with the control knob 116 while allowing limited relative axial movement therebetween by virtue of a drive pin 128 received in a corresponding bore 130 in the control knob. Compression spring 132 is received in corresponding pocket 134 also formed in the control knob 116 exerting, the pin 128 in turn preventing an axial bias force on the pin 128 dragging of the spring 132 across the face of the clutch disk 126. The clutch disk 126 has a cork facing 136 which is adapted to engage a similar cork disk 138 attached to a clutch face of a ratchet gear 140 mounted on the pinion gear shaft 105.

The opposite face of the floating ratchet gear 140 also has a cork disk 142 secured thereto which is in turn adapted to engage a cork disk 144 secured to the face of a second clutching disk 146 which is pinned to the pinion gear shaft 105 to be connected thereto by a pin 150 formed in a hub section 152 integral with the clutch disk 146.

The position of the ratchet gear 140 is controlled by means of the ratchet pawl 36 engaging the teeth of the ratchet gear 140. The lefthanded threaded engagement causes an axial advance of the control knob 116 on the pinion shaft 105 which is held relatively stationary to the control knob 116 by the inertia of the parts and the force of the counterweight, this axial advance in turn causes compression of the spring 132 and interengagement of the cork clutch disk 136 and 138 in turn forcing the ratchet gear 140 into clutching engagement via cork disk 142 and the cork disk 144 secured to the clutching disk 146. The control knob 116 is thus prevented from rotating relative the pinion gear shaft 105 to effectively lock the control knob 116 to the pinion gear shaft 105 to thus allow the pinion gear 104 to be rotated by rotation of the control knob 116. The rotation of the pinion gear 104 in turn causes the gear racks 70 and 90 to be simultaneously driven in opposite directions to move both the upper gaging finger 20 and lower gaging finger 22 so as to be separated against the bias of the counterweight 106.

The engagement of the ratchet pawl 36 maintains the upper gaging finger 20 and the lower gaging finger 22 in any given adjusted position to allow setting up of the workpiece and insertion thereof.

Upon reverse rotation of the control knob 116 the lefthanded thread causes axial retraction of the control knob 116 and the pinion gear shaft 105 which reduces the compression being exerted on compression springs 132 to disengage the respective cork clutching disks 136, 138, 142 and 144, and thereby declutch the ratchet gear 140 from the pinion gear shaft 105. This allows the force applied by counterweight 106 and the weight of the upper gaging finger 20 to gradually move the upper gaging finger 20 and the lower gaging finger 22 to advance slightly toward the closed position. However, as this advancing movement takes place, the rotation of the pinion gear 104 tends to prevent complete disengagement of the pressure applied by the springs 132 so that the declutching of the cork disks 136, 138, 142 and 144 is not completed if the closing rate is greater than the speed with which the knob 116 is rotated by the operator, i.e. there is an overspeeding thereof which tends to reengage the clutch disks.

However, upon the upper gaging finger 20 engaging the workpiece and the lower gaging finger 22 subsequently engaging the workpiece as described above, further rotation of the pinion gear 104 is precluded such that further rotation by the control knob 116 by the operator causes further axial retraction of the control knob 116 which completely disengages the clutching cork disks 136, 138, 142 and 144 by completely relaxing the compression springs 132 so that the only forces exerted on the upper gaging finger 20 and the lower gaging finger 22 is that exerted by the counterweight 106, i.e. 2 ounces. This insures absolutely uniform gaging pressure during the actual gaging operations.

The displacement transducer 28 then generates a signal which is indicative of the gaged dimension, i.e. the corresponding relative position of the upper gaging finger 20 and the lower gaging finger 22. The operator then rotates the control knob 116 counterclockwise once again to separate the upper gaging finger 20 and the lower gaging finger 22 to allow removal of the workpiece 18.

It can be seen that this arrangement offers extreme economy of motion required by the operator allowing a very effective control over the positioning of both of the gaging fingers simultaneously, without introducing any possibility of error due to operator-induced variations in gaging pressure. That is, a single control provides for opening and closing of both gaging finges with an automatic stay-open capability provided by the ratcheting mechanism, together with a controlled closing rate of the engaging fingers with a subsequent automatic release to cause a uniform gaging pressure to be exerted on the workpiece during gaging operations. This is contrasted with the aforementioned prior art devices in which extremely complex arrangements for individual gaging fingers is necessitated and in which separate manual operations are required for positioning of the gaging fingers which devices also introduce the possibility of errors due to the offcentering of the workpiece. Also excessively rapid closing rates may occur in some of these devices causing damage to the workpiece or to the gage itself. It will also be noted that these advantages have been provided with extreme simplicity of design such that the above-recited objects of the invention have been met.

While the control knob assembly is particularly useful in the environment of the opposed contact counterweighted measuring gage, this mechanism could also be used in other applications having similar manipulation control requirements.

Figure 7:
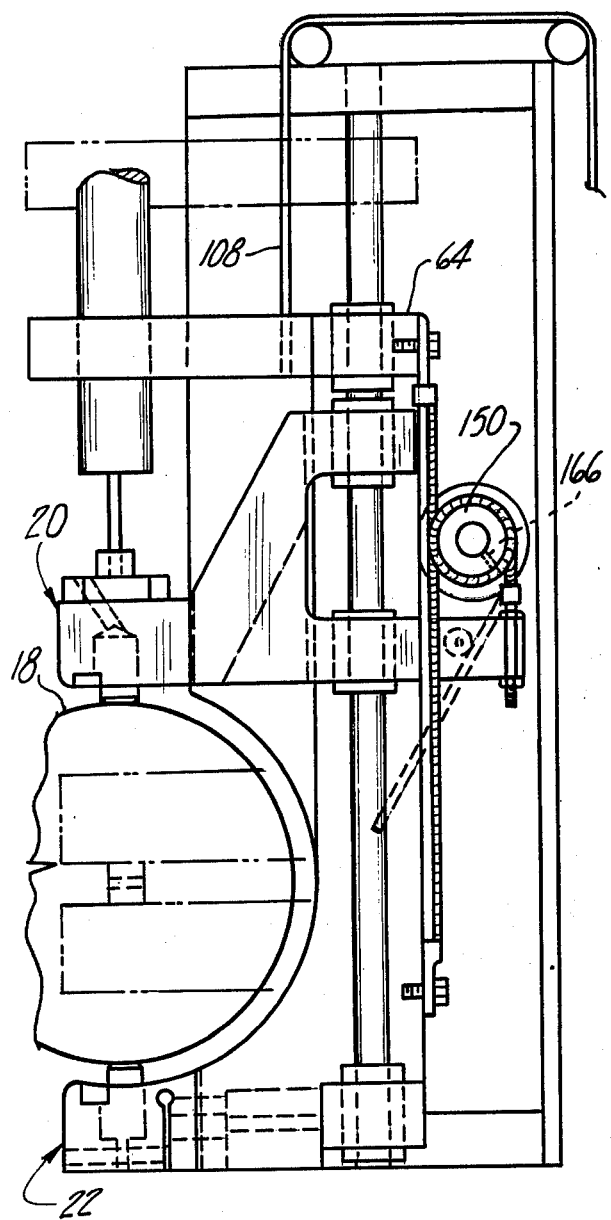
FIG. 7 is a side elevational view of a portion of an alternate form of the measuring gage according to the present invention.
Figure 8:
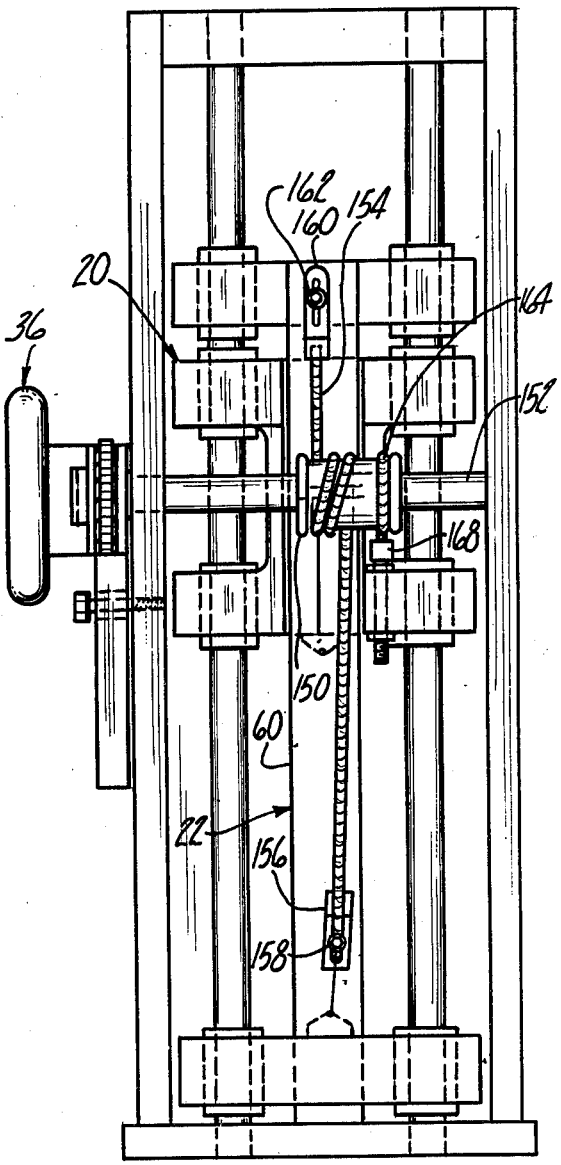
FIG. 8 is a front elevational view of the portion of the measuring gage shown in FIG. 7.

Referring to FIGS. 7 and 8, an alternate form of the measuring gage is depicted. In this embodiment the driving interengagement between the upper and lower gaging finger assemblies is provided by a spool 150 which is mounted on a spool shaft 152 in turn rotatably mounted in the gaging frame. The lower gaging finger assembly 22 is drivingly connected to the spool 150 by means of a first cable 154 which is wrapped on one end of the spool 150 and secured at either end to the lower gaging assembly 22 by means of a bracket 156 and hex bolt 158 securing the same to a lower portion of the lower gaging finger extension arm 60 and at its upper end by a slotted bracket 160 and hex screw 162 secured to the upper portion 64 of the lower gaging finger assembly 22. The slotted bracket 160 allows adjustment of the cable 154 on the spool to insure that it is tight.

The upper gaging finger assembly 20 is also drivingly engaged with the spool 150 by a second cable 164 which is pinned to the spool 150 at one end by means of a pin 166 after approximately ⅜ of a turn about the spool 150, and at its other end is retained in an adjustable cable retainer 168 to position the cable so that the upper gaging finger assembly 20 reaches the center line of the gaging clearance space approximately 1/16" ahead of the lower gaging finger assembly 22, as in the embodiment described above. The spool mounting shaft 152 is manipulated by means of a control knob assembly 36 which is of the same design as that utilized in the above-described embodiment. The lower gaging finger assembly is counterweighed by means of a cable 108, as also is provided in the above-described embodiment. This arrangement allows a simplified float in that upon manipulation of the control knob to allow the upper gaging finger assembly 20 to contact the workpiece 18, the driving interengagement between the upper and lower gaging fingers 20 and 22 is discontinued, since the cable 164 cannot exert a force in compression on the upper gaging finger 20 so that the lower gaging finger assembly 22 can continue to rise under the influence of the force applied by the counterweight to thereby allow for the off-center condition, as described above. At the same time the lesser frictional losses over that of the gear racks allows a lesser gaging force to be exerted, i.e. on the order of a one ounce gaging pressure. This has been accomplished by a reduction in the cost of parts, since precision gear racks are expensive to machine, whereas in the present arrangement only a simple turned spool 150 is required. The proper leading of the upper gaging finger 20 is easily set by means of the adjustment provided by the slotted bracket 160.

The embodiments of the invention in which an exclusive property or privilege is claimed are defined as follows:

1. A measuring gage comprising: a gage frame; a first gaging finger mounted for movement in said gaging frame; a second gaging finger mounted for movement in said frame and located to define a gaging opening between said first and second gaging fingers as said first and second gaging fingers move toward and away from each other by virtue of said respective movements in said gaging frame; displacement transducer means for generating a signal corresponding to the relative position of said first and second gaging fingers, thereby generating a gaging signal corresponding to the dimension of the workpiece engaged by said first and second gaging fingers; means drivingly interconnecting said first and second gaging fingers to produce a substantially corresponding opposite movement of each of said first and second gaging fingers toward and away from each other upon movement of either of said gaging fingers; biasing means for applying a biasing force to one of said first or second gaging fingers in a direction urging said one of said gaging fingers toward the other of said gaging fingers whereby said means drivingly interconnecting said first and second gaging fingers urges said other of said gaging fingers toward said one of said gaging fingers; control means operatively connected to said means drivingly interconnecting said first and second gaging fingers for selectively moving both of said first and second fingers apart against said biasing force.

2. The measuring gage according to claim 1 wherein said interconnecting means includes means allowing a float between said other of said first or second gaging fingers and said interconnecting means, whereby said other of said first or second gaging fingers may be positioned to engage said workpiece initially and allowing continuing closing movement of said one of said first or second gaging fingers to engage said workpiece, notwithstanding the said workpiece being located off-center with respect to said gaging opening.

3. The measuring gage according to claim 2 wherein said means interconnecting said first and second gaging fingers comprises a rotatable member and means drivingly connecting said rotatable member with each of said first and second gaging fingers so that rotation of said rotatable member results in movement of each of said gaging fingers.

4. The measuring gage according to claim 3 wherein said rotatable member comprises a pinion gear and wherein said means drivingly interconnecting said first and second gaging fingers comprises a pair of gear racks, one secured to one of said first or second gaging fingers and further includes means floatingly mounting the other of said gear racks to the other of said first or second gaging fingers and further includes said pinion gear being mounted engaging both of said pair of gear racks to provide said driving interconnection.

5. The measuring gage according to claim 4 wherein said means floatingly mounting said other gear rack comprises a pair of centering springs engaging said other gear rack to allow relative linear movement between said other gear rack and said other of said first or second gaging fingers.

6. The measuring gage according to claim 3 wherein said rotatable member comprises a spool rotatably mounted in said gage, and wherein said means drivingly interconnecting said first and second gaging fingers includes a first cable wound about said spool and secured at both ends of said one gaging finger and a second cable secured at one end to said spool and wound about said spool and secured at its other end to said other gaging finger.

7. The measuring gage according to claim 3 further including means for maintaining said rotatable member in any adjusted rotative position to thereby position said first and second gaging fingers in any adjusted opened position against the force applied by said biasing means.

8. The measuring gage according to claim 3 further including control knob means comprising a control knob and further including clutching means operable to create a driving connection between said control knob and said rotatable member upon rotation of said control knob and release of said driving connection upon rotation of said control in the opposite direction, whereby said rotatable member may be rotated by said control knob by rotation in said one direction.

9. The measuring gage according to claim 8 wherein said clutching means includes means activated by rotation of said control knob in one direction to create said driving connection between said control knob and said rotatable member when said control knob is rotated to produce movement of said frst gaging finger and second gaging finger away from each other.

10. The measuring gage according to claim 9 wherein said clutching means is released upon rotation of said control knob in a direction tending to cause said first gaging finger and second gaging finger to move together upon rotation thereof sufficiently to produce engagement of said first and second gaging fingers with a gage workpiece.

11. The measuring gage according to claim 8 wherein said control knob means includes means for maintaining said rotatable member in any adjusted position selected by rotation of said control knob in said direction tending to move said first and second gaging fingers apart.

12. The measuring gage according to claim 11 wherein said means for maintaining said rotatable member in said any adjusted position includes a ratchet gear and wherein said clutching means includes means releasing said ratchet gear from driving connection to said rotatable member upon rotation of said control knob means in said direction tending to move said first and second gaging fingers toward each other.

13. The measuring gage according to claim 12 including a shaft and wherein said rotatable member is drivingly connected to said shaft, and wherein said clutching means includes a threaded connection between said control knob means and said shaft tending to produce axial movement of said control knob means upon relative rotational movement therebetween.

14. The measuring gage according to claim 13 wherein said clutching means includes a clutching surface formed on said ratchet gear, and wherein said ratchet gear is rotatively mounted on said shaft and wherein said control knob means further includes means creating a driving engagement between said clutching surface on said ratchet gear and a clutch disk fixed to said shaft whereby said ratchet gear is clutched to said shaft upon rotation of said control knob relative to said shaft in a direction tending to produce movemnt of said first and second gaging fingers apart.

15. The measuring gage according to claim 14 wherein said means creating a driving contact between said clutch surface on said ratchet gear and said clutch disk includes another clutch disk rotatively mounted on said shaft interposed between said control knob and said ratchet gear.

16. The measuring gage according to claim 15 further including a compression spring means acting between said control knob and said another clutch disk.

17. The measuring gage according to claim 16 further including a drive pin engaging both said control knob and said another clutch disk to cause said control knob and said another clutch disk to rotate together while allowing relative axial movement therebetween.

18. The measuring gage according to claim 1 wherein said biasing means applying said biasing force comprises a counterweight biasing said one gaging finger toward said other gaging finger.

19. An opposed contact measuring gage comprising: a measuring gage frame; a pair of vertical guide shafts extending within said measuring gage frame; an upper gaging finger assembly; means slidably mounting said upper gaging finger assembly on said vertical guide shafts; a lower gaging finger assembly; means slidably mounting said lower gaging finger assembly on said vertical guide shafts; said lower gaging finger assembly including an extension member extending vertically upward through a clearance space in said upper gaging finger assembly; bearing means slidably mounting an upper portion of said extension member above said upper gaging finger assembly onto said verical guide shafts; means drivingly interconnecting said upper and lower gaging assemblies to produce a substantially corresponding opposite movement of said assemblies toward and away from each other including a rotatable member located in the region of said upper gaging finger assembly through which said extension member passes through said clearance space.

20. The measuring gage according to claim 19 further including biasing means drivingly connected to one of said upper or lower gaging finger assemblies and exerting a force thereon tending to close said upper and lower gaging finger assemblies by means of said means drivingly interconnecting said upper and lower gaging finger assemblies.

21. The measuring gage according to claim 19 wherein said means drivingly interconnecting said upper and lower gaging finger assemblies comprises a pair of gear racks, one of said gear racks carried by each of said upper and lower gaging finger assemblies in the region through which said extension member passes through said clearance space in said upper gaging finger assembly and wherein said rotatable member comprises a pinion gear engaging both of said gear racks.

22. The measuring gage according to claim 21 wherein one of said gear racks is floatingly mounted with respect to the respective gaging finger assembly by which it is carried.

23. The measuring gage according to claim 21 further including control knob means including a control knob and means drivingly connecting said pinion gear and said control knob causing rotation of said pinion gear in a direction tending to separate said upper and lower gaging finger assemblies in response to rotation of said control knob in one direction.

24. The measuring gage according to claim 23 further including biasing means for applying a bias force to said upper and lower gaging finger assemblies tending to close said upper and lower gaging finger assemblies.

25. The measuring gage according claim 24 wherein said control knob means includes a clutching means activated by rotation of said control knob in one direction to create a driving connection between said control knob and said pinion gear when said control knob is rotated to produce movement of said upper gaging finger assembly and lower gaging finger assembly away from each other.

26. The measuring gage according to claim 25 wherein said clutching means includes means releasing said driving connection upon rotation of said control knob in a direction tending to cause said upper gaging finger assembly and lower gaging finger assembly to move together upon rotation thereof sufficient to produce engagement of one of said first and second gaging finger assemblies with a gage workpiece.

27. The measuring gage according to claim 26 wherein said control knob means further includes means for maintaining said pinion gear in any adjusted position selected by rotation of said control knob in said direction tending to move said upper and lower gaging finger assemblies apart.

28. The measuring gage according to claim 27 wherein said means for maintaining said pinion gear in said any adjusted position includes a ratchet gear and wherein said clutching means includes means selectively releasing said ratchet gear from driving connection to said pinion gear upon rotation of said control knob means in said direction tending to move said upper and lower gaging fingers toward each other.

29. The measuring gage according to claim 28 further including a shaft and wherein said pinion gear is connected to said shaft, and wherein said means for selectively releasing said ratchet gear includes a threaded connection between said control knob and said shaft tending to produce axial movement of said control knob upon relative rotational movement therebetween.

30. The measuring gage according to claim 29 wherein said clutching means includes a clutching surface formed on said ratchet gear, and wherein said ratchet gear is rotationally mounted on said shaft and wherein said control knob means further includes a clutch disk fixed to said shaft and means creating a driving engagement between said clutch surface on said ratchet gear and said clutch disk fixed to said shaft whereby said ratchet gear is clutched to said shaft upon rotation of said control knob relative said shaft in a direction tending to produce movement of said upper and lower gaging finger assemblies apart.

31. The measuring gage according to claim 30 wherein said means creating a driving contact between said clutch surface on said ratchet gear and said clutch disk includes another clutch disk rotatively mounted on said shaft interposed between said control knob and said ratchet gear.

32. The measuring gage according to claim 31 further including a compression spring means acting between said control knob and said another clutch disk.

33. The measuring gage according to claim 32 further including a drive pin engaging both said control knob and said another clutch disk to cause said control knob and said another clutch disk to rotate together while allowing relative axial movement therebetween.

34. The measuring gage according to claim 24 wherein said biasing means includes counterweight means connected to said lower gaging finger assembly extension member and drivingly urging said lower gaging finger assembly upwards and said upper gaging finger assembly downward by operation of said means drivingly interconnecting said upper gaging finger assembly and lower gaging finger assembly.

35. The measuring gage according to claim 19 further including a displacement transducer means including a housing and a movable sizing rod and means for generating signals corresponding to the relative displacement of said sizing rod and said housing and also includes means connecting one of said housing or said sizing rod to one of said upper or lower gaging finger assemblies and the other of said housing or said sizing rod to the other of said upper or lower gaging finger assemblies whereby signals are generated corresponding to the relative displacement of said upper gaging finger assembly and lower gaging finger assembly.

36. The measuring gage according to claim 35 wherein said housing is connected to said lower gaging finger assembly extension member in the region above said upper gaging finger assembly and said sizing rod extends downwardly from said housing and is connected to said upper gaging finger assembly.

* * * * *